United States Patent Office 3,829,411
Patented Aug. 13, 1974

3,829,411
THIADIAZOLYL-AZO-INDOLE COMPOUNDS
Clarence A. Coates, Jr., and Max A. Weaver, Kingsport, Tenn., assignors to Eastman Kodak Company, Rochester, N.Y.
No Drawing. Filed Mar. 29, 1972, Ser. No. 239,338
Int. Cl. C09b 29/36; D06p 3/24, 3/52
U.S. Cl. 260—158          10 Claims

ABSTRACT OF THE DISCLOSURE

Azo compounds having the general formula

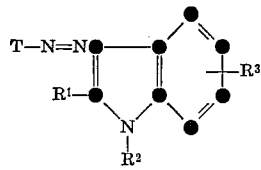

in which T is a disperse dye 1,3,4-thiadiazol-2-yl or 1,3,5-thiadiazol-2-yl diazo component; $R^1$ is aryl; $R^2$ is hydrogen, alkyl, cyanoalkyl, unsubstituted or substituted carbamoylalkyl or acylamidoalkyl; and $R^3$ is hydrogen, alkyl, alkoxy or halogen. The compounds are useful for dyeing cellulose acetate, polyester and, especially, polyamide fibers on which the compounds produce yellow to orange shades and exhibit good dyeability and fastness to light and washing.

---

This invention concerns novel thiadiazolyl-azo-indole compounds and certain synthetic fibers dyed therewith.

Our novel azo compounds have the general formula

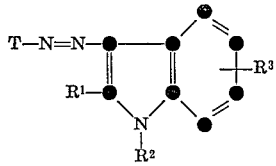

wherein

T is a disperse dye 1,3,4-thiadiazol-2-yl or 1,3,5 - thiadiazol-2-yl diazo component;

$R^1$ is aryl;

$R^2$ is hydrogen, lower alkyl, cyanoethyl, lower alkylsulfonamidopropyl, arylsulfonamidopropyl, —$(CH_2)_n$—$CONR^5R^6$ —$CH_2CH_2CH_2NHCO$—$R^7$, or a group having the formula

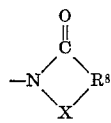

in which $n$ is 2 or 3; $R^5$ individually is hydrogen, lower alkyl, cyclohexyl, aryl, hydroxymethyl, benzyl or 1,1-dimethyl-3-oxobutyl; $R^6$ individually is hydrogen or, when $R^5$ is hydrogen or lower alkyl, $R^8$ also can be lower alkyl; $R^5$ and $R^6$ collectively are pentamethylene or ethyleneoxyethylene; $R^7$ is hydrogen; lower alkyl; lower alkyl substituted hydroxy, lower alkoxy, lower alkylthio, lower alkanoyloxy, cyano, carbamoyl, aryl, halogen, aryloxy or lower alkylsulfonyl; cyclohexyl; lower alkylcyclohexyl; lower alkoxy; furyl; allyl; or aryl; $R^8$ is ethylene, trimethylene, 1,2-propylene, o-phenylene, or o-phenylene substituted with lower alkyl, lower alkoxy or halogen; X is —CO—, —$CH_2$— or —$SO_2$—; and in which each aryl group is phenyl or phenyl substituted with lower alkyl, lower alkoxy or halogen; and $R^3$ is hydrogen, lower alkyl, lower alkoxy or halogen.

The novel compounds produce bright yellow to orange shades when applied to synthetic fibers such as those spun from cellulose acetate, polyester and, especially polyamide materials according to conventional disperse dyeing procedures. Our novel compound in general exhibits good to excellent dyeability and fastness to light and washing. The polyamide and polyester fibers which can be dyed with the novel azo compounds can be either textile or carpet fibers.

The thiadiazolyl diazo components represented by T are well-known to those skilled in the art as is exemplified by the many patents, such as U.S. Pats. 3,096,320, 3,221,-006, 3,418,310 and 3,493,556 and French Pats. 1,503,249, 2,019,449, 2,028,396 and 2,049,189, which disclose azo compounds containing such diazo components. Since the radicals represented by T are disperse dye diazo components, they are free of water-solubilizing groups or groups capable of rendering the azo compounds water soluble such as sulfo and carboxyl groups.

Examples of the substituents which can be present on the 5-carbon atoms of the 1,3,4-thiadiazol-2-yl diazo components and/or on the 4-carbon atom of the 1,3,5-thiadiazol-2-yl diazo components include the following: halogen such as chloro or bromo; cycloalkyl such as cyclohexyl and lower alkylcyclohexyl; aryl; alkylsulfonyl; and groups represented by $R^9$— and $R^9$—Y— in which $R^9$ is alkyl; substituted alkyl such as alkyl substituted with hydroxy, halogen, alkanoyloxy, alkanoyl, alkoxy, aroyl, alkoxycarbonyl cyano, a group having the formula —NHCO—$R^7$ or     —$CONR^5R^6$

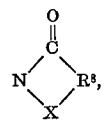

cycloalkyl, aryl, allyl, aryloxy; alkyl, cycloalkyl; or aryl; and Y is —O— or —S—. The substituents on the 1,3,5-thiadiazol-2-yl radicals should, in general, be selected from alkyl, alkylsulfonyl, aryl and those having the formula $R^9$—S—. The groups containing an alkyl moiety and which can be present on diazo component T preferably contain up to about four carbon atoms which is designated herein by "lower." A preferred group of radicals represented by T have the formula

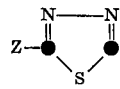

in which Z is hydrogen, halogen, lower alkylsulfonyl, or a group designated $R^9$— or $R^9$—Y— in which $R^9$ is lower alkyl; lower alkyl substituted with hydroxy, halogen, lower alkanoyloxy, lower alkoxycarbonyl, lower alkoxy, cyano, carbamoyl, succinimido, cyclohexyl, lower alkylcyclohexyl, or aryl; cyclohexyl; lower alkylcyclohexyl; or aryl; and Y is —O— or —S—. The substituents $R^1$—$R^9$ described generically hereinabove are well-known and the compounds containing them are obtained by known means from readily-obtainable intermediates.

Preferred coupling components are those in which $R^1$ is phenyl, $R^2$ is hydrogen, lower alkyl, lower alkylsulfonamidopropyl, —$CH_2CH_2CONR^5R^6$ in which $R^5$ and $R^6$ each is hydrogen or lower alkyl, or

—$CH_2CH_2CH_2NHCO$—$R^7$ in which $R^7$ is lower alkyl, lower alkoxy, cyclohexyl or phenyl, and $R^3$ is hydrogen.

A group of our novel compounds which, because of their cost: performance ratio, are particularly valuable for dyeing polyamide fibers have the formula

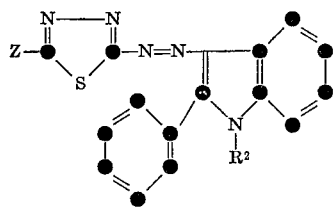

wherein Z is lower alkyl, lower alkylthio or lower alkoxy and R² is hydrogen, lower alkyl, carbamoylethyl, lower alkanoylaminopropyl, lower alkoxycarbonylaminopropyl or lower alkylsulfonamidopropyl.

The novel azo compounds are prepared by diazotizing an amine having the formula T—NH₂ and coupling the resulting diazonium salt with an indole having the formula

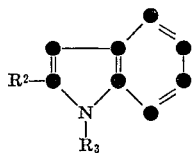

according to conventional procedures. The amine diazo precursors can be synthesized by published techniques or techniques analogous thereto.

The indole couplers also are synthesized by known procedures using known or readily-obtainable intermediates. For example, an N-cyanoalkyl-2-arylindole can be hydrolyzed in the presence of sulfuric acid to yield the corresponding N-carbamoylethyl compound. The carbamoyl group can be hydrogenated in the presence of ammonia and a nickel catalyst to yield the aminoalkyl compound which then is treated with a variety of acylating agents to yield N-acylaminoalkyl-2-arylindole couplers. These and additional techniques are described in detail in the literature.

The azo compounds of the invention and their preparation and use are further illustrated by the following examples.

Example 1

N-(2-Cyanoethyl)-2-phenylindole (46.0 g.) in ethanol (200 ml.) is hydrogenated in the presence of Raney nickel (10 g.) and ammonia (25 g.) at 100° C. and 1500 p.s.i. hydrogen pressure until the hydrogen uptake ceases. The Raney nickel is removed by filtration and the ethanol is evaporated to yield 42.0 g. of oily product which consists essentially of N-(3-aminopropyl)-2-phenylindole.

Example 2

N-(3-Aminopropyl)-2-phenylindole (42.0 g.) is dissolved in benzene (100 ml.). Acetic anhydride (18 ml.) is added dropwise, and then the solution is refluxed for 2 hours. After cooling, the reaction mixture is drowned into hexane. The product, N-(3-acetamidopropyl)-2-phenylindole (44.5 g.) is collected by filtration, washed with hexane and dried in air. It melts at 127–129° C.

Example 3

N-(2-Cyanoethyl)-2-phenylindole (16.0 g.) is added portion-wise with stirring to 80 ml. of conc. H₂SO₄ at about 25° C. The reaction mixture is allowed to stand at room temperature for 24 hours and then drowned into an ice-water mixture. The mixture is partially neutralized by adding conc. NH₄OH. The product, N-(2-carbamoylethyl)-2-phenylindole (13.5 g.), is collected by filtration, washed with water and dried in air.

Examples 4–13

To 50 ml. of conc. H₂SO₄ is added 7.2 g. NaNO₂ portionwise with stirring. The solution is cooled and 100 ml. of 1:5 acid is added below 20° C. The mixture is cooled to about 3° C. and 16.1 g. of 2-amino-5-ethylthio-1,3,4-thiadiazole is added below 20° C., followed by 100 ml. 1:5 acid, all below 5° C. The reaction is stirred at 0–5° C. for 2 hours. The following couplers (.01 mole) are dissolved in 40 ml. of 1:5 acid:

N-(2-Carbamoylethyl)-2-phenylindole (Example 4)
N-(3-Acetamidopropyl)-2-phenylindole (Example 5)
N-(3-Ethoxycarbonylaminopropyl)-2-phenylindole (Example 6)
N-(3-Propionamidopropyl)-2-phenylindole (Example 7)
N-(3-Methanesulfonamidopropyl)-2-phenylindole (Example 8)
N-(3-Chloroacetamidopropyl)-2-phenylindole (Example 9)
N-(3-iso-Butyramidopropyl)-2-phenylindole (Example 10)
N-(3-Cyclohexylcarbonylaminopropyl)-2-phenylindole (Example 11)
N-(3-Hydroxyacetamidopropyl)-2-phenylindole (Example 12)
N-(3-Acetamidopropyl)-5-methyl-2-phenylindole (Example 13)

To each chilled coupler solution is added a .01 mole aliquot of diazonium solution. The coupling mixtures are buffered by the addition of ammonium acetate and allowed to stand for one hour. The azo compound products are precipitated by the addition of water, collected by filtration; washed with water, dried in air and, if necessary, purified by slurrying in hot methanol followed by cooling, filtering and washing with cold methanol. Each of the ten azo compounds obtained produces bright, level, orange shades on polyamide fibers and exhibit good fastness to light.

The azo compounds set forth in the following table are prepared by the procedures described hereinabove and conform to formula (I) in which "1,3,5-T" designates a 1,3,5-triazol-2-yl residue and "1,3,4-T" designates a 1,3,4-triazol-2-yl nucleus. Table Examples 4–13 designate the formulas of the compounds prepared in preceding Examples 4–13.

TABLE

| Example number | T | R¹ | R² | R³ | Color |
|---|---|---|---|---|---|
| 4 | 5-C₂H₅S-1,3,4-T | —C₆H₅ | —CH₂CH₂CONH₂ | H | Yellow. |
| 5 | 5-C₂H₅S-1,3,4-T | —C₆H₅ | —(CH₂)₃NHCOCH₃ | H | Do. |
| 6 | 5-C₂H₅S-1,3,4-T | —C₆H₅ | —(CH₂)₃NHCOOC₂H₅ | H | Do. |
| 7 | 5-C₂H₅S-1,3,4-T | —C₆H₅ | —(CH₂)₃NHCOC₂H₅ | H | Do. |
| 8 | 5-C₂H₅S-1,3,4-T | —C₆H₅ | —(CH₂)₃NHSO₂CH₃ | H | Do. |
| 9 | 5-C₂H₅S-1,3,4-T | —C₆H₅ | —(CH₂)₃NHCOCH₂Cl | H | Do. |
| 10 | 5-C₂H₅S-1,3,4-T | —C₆H₅ | —(CH₂)₃NHCOCH₂CH(CH₃)₂ | H | Do. |
| 11 | 5-C₂H₅S-1,3,4-T | —C₆H₅ | —(CH₂)₃NHCOC₆H₁₁ | H | Do. |
| 12 | 5-C₂H₅S-1,3,4-T | —C₆H₅ | —(CH₂)₃NHCOCH₂OH | H | Do. |
| 13 | 5-C₂H₅S-1,3,4-T | —C₆H₅ | —(CH₂)₃NHCOCH₃ | 5-CH₃ | Do. |
| 14 | 5-CH₃S-1,3,4-T | —C₆H₅ | —(CH₂)₃NHCOCH(CH₃)₂ | H | Do. |
| 15 | 5-CH₃S-1,3,4-T | —C₆H₅ | —(CH₂)₃NHCOCH₂OH | H | Do. |
| 16 | 5-CH₃S-1,3,4-T | —C₆H₅ | —(CH₂)₃NHCOCH₂CH₂Cl | H | Do. |
| 17 | 5-CH₃CH₂CH₂S-1,3,4-T | —C₆H⁵ | —(CH₂)₃NHCO-CHCH-CO | H | Do. |
| 18 | 5-CH₃CH₂CH₂S-1,3,4-T | —C₆H₅ | —(CH₂)₃NHCOC₆H₅ | H | Do. |
| 19 | 5-CH₃CH₂CH₂S-1,3,4-T | —C₆H₅ | —(CH₂)₃NHCOCH=CH₂ | H | Do. |
| 20 | 5-CH₃(CH₂)₃S-1,3,4-T | —C₆H₅ | —(CH₂)₃NHCOCH₂CH(CH₃)₂ | H | Do. |
| 21 | 5-CH₃(CH₂)₃S-1,3,4-T | —C₆H₅ | —CH₂CH₂CONH₂ | H | Do. |
| 22 | 5-C₆H₅CH₂S-1,3,4-T | —C₆H₅ | —CH₂CH₂CONH₂ | H | Do. |
| 23 | 5-C₆H₅CH₂S-1,3,4-T | —C₆H₅ | —(CH₂)NHCOC₂H₅ | H | Do. |

TABLE—Continued

| Example number | T | R¹ | R² | R³ | Color |
|---|---|---|---|---|---|
| 24 | 5-HOCH₂CH₂S-1,3,4-T | —C₆H₅ | —(CH₂)NHCOC₂H₅ | H | Do. |
| 25 | 5-C₆H₅COCH₂S-1,3,4-T | —C₆H₅ | —(CH₂)NHCOC₂H₅ | H | Do. |
| 26 | 5-H₂NCOCH₂S-1,3,4-T | —C₆H₅ | —(CH₂)NHCOC₂H₅ | H | Do. |
| 27 | 5-C₆H₁₁CH₂S-1,3,4-T | —C₆H₅ | —(CH₂)NHCOC₂H₅ | H | Do. |
| 28 | 5-C₂H₅S-1,3,4-T | —C₆H₄-p-CH₃ | —(CH₂)NHCOC₂H₅ | H | Do. |
| 29 | 5-C₂H₅S-1,3,4-T | —C₆H₄-p-CH₃ | —(CH₂)NHCOC₂H₅ | 5-CH₃ | Do. |
| 30 | 5-C₂H₅S-1,3,4-T | —C₆H₄-p-OCH₃ | —(CH₂)NHCOC₂H₅ | 6-CH₃ | Do. |
| 31 | 5-C₂H₅S-1,3,4-T | —C₆H₄-p-Cl | —(CH₂)NHCOC₂H₅ | H | Do. |
| 32 | 5-C₂H₅S-1,3,4-T | —C₆H₅ | —CH₂CH₂CONH₂ | 6-Cl | Do. |
| 33 | 5-C₂H₅S-1,3,4-T | —C₆H₅ | —CH₂CH₂CONH₂ | H | Do. |
| 34 | 5-C₂H₅S-1,3,4-T | —C₆H₅ | —CH₂CH₂CN | H | Do. |
| 35 | 5-C₂H₅S-1,3,4-T | —C₆H₅ | —(CH₂)₃NCOCH₂CH₂CO | H | Do. |
| 36 | 5-C₂H₅S-1,3,4-T | —C₆H₅ | H | H | Orange. |
| 37 | 5-C₂H₅S-1,3,4-T | —C₆H₅ | —CH₃ | H | Yellow. |
| 38 | 5-C₆H₅CH₂S-1,3,4-T | —C₆H₅ | —CH₃ | H | Do. |
| 39 | 5-C₂H₅OCH₂CH₂S-1,3,4-T | —C₆H₅ | —CH₂CH₂CONH₂ | H | Do. |
| 40 | 5-CH₃-1,3,4-T | —C₆H₅ | H | H | Do. |
| 41 | 5-CH₃-1,3,4-T | —C₆H₅ | —CH₂CH₂CONH₂ | H | Do. |
| 42 | 5-C₂H₅-1,3,4-T | —C₆H₅ | —CH₂CH₂CONH₂ | H | Do. |
| 43 | 5-C₆H₁₁-1,3,4-T | —C₆H₅ | —CH₂CH₂CONH₂ | H | Do. |
| 44 | 5-p-CH₃OOC-C₆H₄-1,3,4-T | —C₆H₅ | —CH₂CH₂CONH₂ | H | Orange. |
| 45 | 5-(CH₃)₂CH-1,3,4-T | —C₆H₅ | —(CH₂)₃NHCOCH₃ | H | Yellow. |
| 46 | 5-Cl-1,3,4-T | —C₆H₅ | —(CH₂)₃NHCOCH₃ | H | Orange. |
| 47 | 5-C₆H₅-SO₂-1,3,4-T | —C₆H₅ | —(CH₂)₃NHCOCH₃ | H | Do. |
| 48 | 5-CF₃-1,3,4-T | —C₆H₅ | —(CH₂)₃NHCOCH₃ | H | Do. |
| 49 | 5-OHC-1,3,4-T | —C₆H₅ | —(CH₂)₃NHCOCH₃ | H | Do. |
| 50 | 5-CH₂=CHCH₂S-1,3,4-T | —C₆H₅ | —(CH₂)₃NHCOCH₃ | H | Yellow. |
| 51 | 5-CH₂=CHCH₂S-1,3,4-T | —C₆H₅ | —CH₂CH₂CONH₂ | H | Do. |
| 52 | 5-C₂H₅O-1,3,4-T | —C₆H₅ | —CH₂CH₂CONH₂ | H | Do. |
| 53 | 5-C₂H₅O-1,3,4-T | —C₆H₅ | —CH₃ | H | Do. |
| 54 | 5-C₂H₅O-1,3,4-T | —C₆H₅ | —(CH₂)₃NHCOCH₃ | H | Do. |
| 55 | 4-CH₃S-1,3,5-T | —C₆H₅ | H | H | Orange. |
| 56 | 4-CH₃S-1,3,5-T | —C₆H₅ | —CH₃ | H | Do. |
| 57 | 4-CH₃S-1,3,5-T | —C₆H₅ | —CH₂CH₂CN | H | Do. |
| 58 | 4-CH₃S-1,3,5-T | —C₆H₅ | —CH₂CH₂CONH₂ | H | Do.³ |
| 59 | 4-CH₃S-1,3,5-T | —C₆H₅ | —(CH₂)₃NHCOCH₃ | H | Do. |
| 60 | 4-CH₃S-1,3,5-T | —C₆H₅ | —(CH₂)₃NHSO₂CH₃ | H | Do. |
| 61 | 4-CH₃S-1,3,5-T | —C₆H₅ | —(CH₂)₃NHSO₂CH₃ | H | Do. |
| 62 | 4-CH₃S-1,3,5-T | —C₆H₅ | —(CH₂)₃NHCOOC₂H₅ | H | Do. |
| 63 | 4-CH₃S-1,3,5-T | —C₆H₅ | —(CH₂)₃NHCOCH₂CH₂Cl | H | Do. |
| 64 | 4-CH₃S-1,3,5-T | —C₆H₅ | -(CH₂)₃NHCOC=CHCH=CHO | H | Do. |
| 65 | 4-CH₃S-1,3,5-T | —C₆H₅ | —(CH₂)₃NHCOC₆H₅ | H | Do. |
| 66 | 4-CH₃S-1,3,5-T | —C₆H₅ | —(CH₂)₃NHCOCH₂OC₆H₅ | H | Do. |
| 67 | 4-CH₃S-1,3,5-T | —C₆H₄-p-CH₃ | —(CH₂)₃NHCOC₂H₅ | H | Do. |
| 68 | 4-CH₃S-1,3,5-T | —C₆H₄-p-OCH₃ | —(CH₂)₃NHCOC₂H₅ | H | Do. |
| 69 | 4-CH₃S-1,3,5-T | —C₆H₄-p-Cl | —(CH₂)₃NHCOC₂H₅ | 5-CH₃ | Do. |
| 70 | 4-CH₃S-1,3,5-T | —C₆H₅ | —(CH₂)₃NHCOC₆H₁₁ | 6-CH₃ | Do. |
| 71 | 4-CH₃S-1,3,5-T | —C₆H₅ | —(CH₂)₃NHCOC₆H₁₁ | 5-OCH₃ | Do. |
| 72 | 4-CH₃S-1,3,5-T | —C₆H₅ | —(CH₂)₃NHCOC₆H₁₁ | 5-Br | Do. |
| 73 | 4-CH₃S-1,3,5-T | —C₆H₅ | —(CH₂)₃NHCOCH₃ | H | Do. |
| 74 | 4-C₂H₅S-1,3,5-T | —C₆H₅ | —(CH₂)₃NHCOCH₃ | H | Do. |
| 75 | 4-CH₂=CHCH₂S-1,3,5-T | —C₆H₅ | —CH₃ | H | Co. |
| 76 | 4-C₆H₅CH₂S-1,3,5-T | —C₆H₅ | —CH₂CH₂CONH₂ | H | Do. |
| 77 | 4-C₆H₅CH₂S-1,3,5-T | —C₆H₅ | —CH₂CH₂CONH₂ | H | Do. |
| 78 | 4-H₂NCOCH₂S-1,3,5-T | —C₆H₅ | —CH₂CH₂CONH₂ | H | Do. |
| 79 | 4-CH₃(CH₂)₃S-1,3,5-T | —C₆H₅ | —CH₂CH₂CONH₂ | H | Do. |
| 80 | 4-(CH₃)₂CHS-1,3,5-T | —C₆H₅ | —CH₂CH₂CONH₂ | H | Do. |
| 81 | 4-HOCH₂CH₂S-1,3,5-T | —C₆H₅ | —CH₂CH₂CONH₂ | H | Do. |
| 82 | 4-CH₃S-1,3,5-T | —C₆H₅ | —(CH₂)₃NCO-o-C₆H₄CO | H | Do. |
| 83 | 4-C₆H₅-1,3,5-T | —C₆H₅ | —CH₂CH₂CONH₂ | H | Do. |
| 84 | 4-C₆H₅-1,3,5-T | —C₆H₅ | H | H | Do. |
| 85 | 4-C₆H₅-1,3,5-T | —C₆H₅ | —(CH₂)₃NHCOCH₃ | H | Do. |
| 86 | 4-CH₃-1,3,5-T | —C₆H₅ | H | H | Yellow. |
| 87 | 4-CH₃-1,3,5-T | —C₆H₅ | —(CH₂)₃NHCOCH(CH₃)₂ | H | Do. |
| 88 | 4-C₆H₁₁CH₂S-1,3,5-T | —C₆H₅ | —(CH₂)₃NHCOCH(CH₃)₂ | H | Orange. |
| 89 | 4-C₆H₅CH₂CH₂S-1,3,5-T | —C₆H₅ | —(CH₂)₃NHCOCH(CH₃)₂ | H | Do. |
| 90 | 4-CH₃OCH₂CH₂S-1,3,5-T | —C₆H₅ | —(CH₂)₃NHCOCH(CH₃)₂ | H | Do. |

The novel azo compounds can be applied to nylon, cellulose acetate and polyester textile and carpet materials according to known disperse dyeing techniques. Various dispersing and wetting agents can be employed in the dispersion of the finely divided dye compound in an essentially aqueous dyebath. Procedures by which the compounds of the invention can be applied to nylon and polyester textile materials are described in U.S. Pats. 2,880,050; 2,757,064; 2,782,187; 3,100,134 and 3,320,021. The following examples illustrate methods for applying the novel compounds to polyamide fibers and polyester fibers, respectively.

Example 91

The azo compound (50.0 mg.) of Example 4 is dispersed in 5 cc. of 2-methoxyethanol. A small amount (3–5 cc.) of a 3% sodium lignin sulfonate solution is added, with stirring, and then the volume of the bath is brought to 150 cc. with water. A 5.0 g. textile fabric made of nylon 66 fibers is placed in the bath which is then slowly brought to the boil. The dyeing is carried out at the boil for 1 hr. with occasional stirring. The dyeing is carried out at the boil for 1 hr. with occasional stirring. The dyed fabric is then removed from the dyebath, rinsed with water, and dried in an oven at 250° F. The fabric is dyed a bright shade of orange exhibiting excellent fastness properties when tested in accordance with the procedures described in the Technical Manual of the American Association of Textile Chemists and Colorists (AATCC), 1968 edition.

Example 92

The azo compound of Example 35 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an o-phenylphenol (Carolid) is added to the bath and 10 g. of a textile fabric made of poly(ethylene terephthalate) fibers is placed in the bath and worked 10 min. without heat. The dyeing is carried out at the boil for 1 hr. The dyed fabric is removed from the dyebath and scoured for 20 min. at 80° C. in a solution containing 1 g./l. neutral soup and 1 g./l. sodium carbonate. The fabric is then rinsed, dried in an oven at 250° F. and heat set (for removal of residual carrier) for 5 min. at 350° C. The polyester fabric is dyed a bright orange shade which exhibits excellent fastness to light and resistance to sublimation when tested according to conventional AATCC procedures.

The compounds of the invention can also be applied to polyester textile materials by the heat fixation technique described in U.S. Pat. 2,663,612 and in the American Dyestuff Reporter, 42, 1 (1953).

As used herein, "nylon textile and carpet materials" means fibers, including yarns and fabrics prepared therefrom, having a basis of a synthetic linear polyamide such as nylon 66 (polyhexamethylene adipamide) manufactured by the polymerization of adipic acid and hexamethylenediamine, nylon 6 (polycaprolactam) prepared from, having a basis of a synthetic linear polyamide such and nylon 8. A detailed description of the synthetic polyamide materials which are dyed bright fast shades by the compounds of the invention is set forth in U.S. Pat. 3,100,134. Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010; 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly-(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amount of other additives such as brighteners, pigments, delusterants, inhibitors, stabilizers, etc.

The invention has been described in detail with particular reference to preferred embodiments thereof, but it will be understood that variations and modifications can be effected within the spirit and scope of the invention.

We claim:
1. A compound having the formula

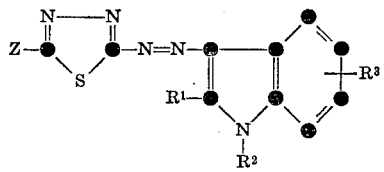

or

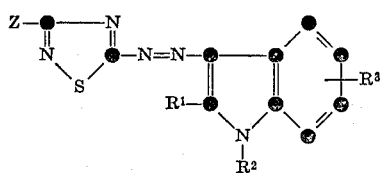

wherein

Z is hydrogen, halogen, lower alkylsulfonyl, $R^9$— or $R^9$—Y— in which $R^9$ is lower alkyl; lower alkyl substituted with hydroxy, halogen, lower alkanoyloxy, lower alkoxycarbonyl, lower alkoxy, cyano, carbamoyl, succinamido, cyclohexyl, lower alkylcyclohexyl or phenyl; cyclohexyl; lower alkylcyclohexyl; or phenyl; and Y is —S— or —O—;

$R^1$ is aryl;

$R^2$ is hydrogen, lower alkyl, cyanoethyl, lower alkylsulfonamidopropyl, arylsulfonamidopropyl, —(CH$_2$)$_n$CONR$^5$R$^6$, —CH$_2$CH$_2$CH$_2$NHCO—R$^7$ or

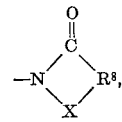

in which $n$ is 2 or 3;

$R^5$ individually is hydrogen, lower alkyl, cyclohexyl, aryl, hydroxymethyl, benzyl or 1,1-dimethyl-3-oxobutyl;

$R^6$ individually is hydrogen or, when $R^5$ is hydrogen or lower alkyl, $R_6$ also can be lower alkyl;

$R^5$ and $R^6$ collectively are pentamethylene or ethyleneoxyethylene;

$R^7$ is hydrogen; lower alkyl, lower alkyl substituted with hydroxy, lower alkoxy, lower alkylthio, lower alkanoyloxy, cyano, carbamoyl, aryl, halogen, aryloxy or lower alkylsulfonyl; cyclohexyl; lower alkylcyclohexyl; lower alkoxy; furyl; allyl; or aryl;

$R^8$ is ethylene; trimethylene; 1,2-propylene; o-phenylene; or o-phenylene substituted with lower alkyl, lower alkoxy or halogen;

X is —CO—, —CH$_2$—, or —SO$_2$—; and $R^3$ is hydrogen, lower alkyl, lower alkoxy or halogen; and in which each aryl group is phenyl or phenyl substituted with lower alkyl, lower alkoxy or halogen.

2. A compound according to Claim 1 having the formula

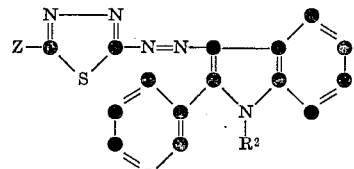

wherein

Z is hydrogen, halogen, lower alkylsulfonyl, $R^9$— or $R^9$—Y— in which $R^9$ is lower alkyl; lower alkyl substituted with hydroxy, halogen, lower alkanoyloxy, lower alkoxycarbonyl, lower alkoxy, cyano, carbamoyl, succinamido, cyclohexyl, lower alkylcyclohexyl or phenyl; cyclohexyl; lower alkylcyclohexyl; or phenyl; and Y is —S— or —O—; and $R^2$ is hydrogen, lower alkyl, lower alkylsulfonamidopropyl,

—CH$_2$CH$_2$CONR$^5$R$^6$ in which $R^5$ and $R^6$ each is hydrogen or lower alkyl, or —CH$_2$CH$_2$CH$_2$NHCO—R$^7$ in which $R^7$ is lower alkyl, lower alkoxy, cyclohexyl, or phenyl.

3. A compound according to Claim 2 wherein Z is lower alkyl, lower alkylthio or lower alkoxy and $R^2$ is hydrogen, lower alkyl, carbamoylethyl, lower alkanoylaminopropyl, lower alkoxycarbonylaminopropyl or lower alkylsulfonamidopropyl.

4. A compound according to Claim 1 having the formula

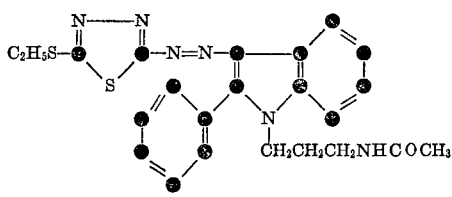

5. A compound according to Claim 1 having the formula

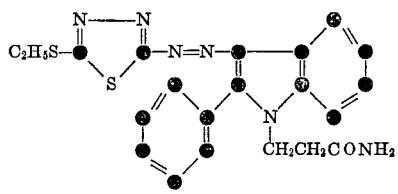

6. A compound according to Claim 1 having the formula

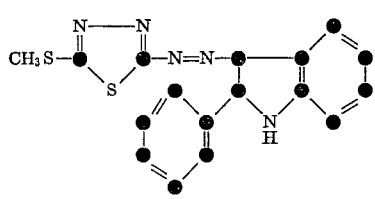

7. A compound according to Claim 1 having the formula

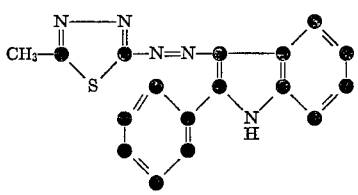

8. A compound according to Claim 1 having the formula

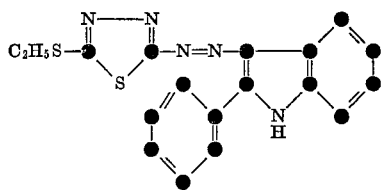

9. A compound according to Claim 1 having the formula

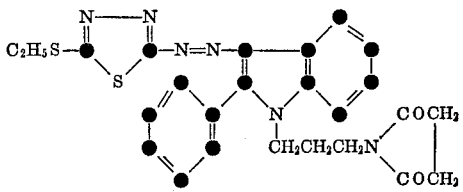

10. A compound according to Claim 1 having the formula

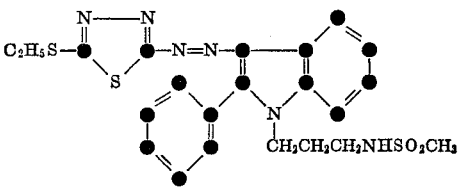

References Cited

UNITED STATES PATENTS

| | | | |
|---|---|---|---|
| 2,922,690 | 1/1960 | Mueller et al. | 260—158 X |
| 3,136,751 | 6/1964 | Iizuka et al. | 260—158 |
| 3,314,934 | 4/1967 | Leuchs | 260—158 |

FOREIGN PATENTS

| | | | |
|---|---|---|---|
| 1,018,458 | 1/1966 | Great Britain | 260—158 |
| 3,810,737 | 6/1963 | Japan | 260—158 |

FLOYD DALE HIGEL, Primary Examiner

U.S. Cl. X.R.

8—41B, 41 C; 260—326.3, 326.62, 326.85

UNITED STATES PATENT OFFICE
CERTIFICATE OF CORRECTION

Patent No. 3,829,411         Dated August 13, 1974

Inventor(s) Clarence A. Coates, Jr. and Max A. Weaver

It is certified that error appears in the above-identified patent and that said Letters Patent are hereby corrected as shown below:

Col. 8 (Claim 1), line 13, delete "$-(CH_2)_n CONR^5 R^6$," and insert --- $-(CH_2)_n-CONR^5 R^6$, ---

Col. 8 (Claim 1), lines 20-23, after the formula delete "in which" and insert therefor ---and $R^3$ is hydrogen, lower alkyl, lower alkoxy or halogen; in which---

Col. 8 (Claim 1), line 29, delete "$R_6$" and insert therefor ---$R^6$---

Col. 8 (Claim 1), delete line 42.

Col. 9 (Claim 6), delete the formula therein and insert

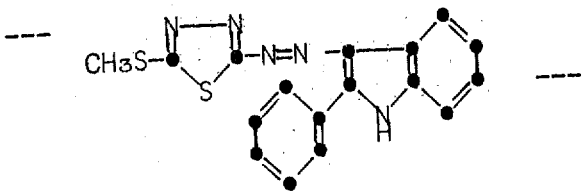

Signed and sealed this 29th day of October 1974.

(SEAL)
Attest:

McCOY M. GIBSON JR.
Attesting Officer

C. MARSHALL DANN
Commissioner of Patents